(12) United States Patent
Singh

(10) Patent No.: US 11,960,656 B2
(45) Date of Patent: *Apr. 16, 2024

(54) APPARATUS AND METHODS FOR CONTACT-MINIMIZED ATM TRANSACTION PROCESSING USING RADAR-BASED GESTURE RECOGNITION AND AUTHENTICATION

(71) Applicant: Bank of America Corporation, Charlotte, NC (US)

(72) Inventor: Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,383

(22) Filed: Jan. 5, 2023

(65) Prior Publication Data
US 2023/0143436 A1  May 11, 2023

Related U.S. Application Data

(63) Continuation of application No. 17/140,170, filed on Jan. 4, 2021, now Pat. No. 11,573,643.

(51) Int. Cl.
| | |
|---|---|
| *G06F 3/01* | (2006.01) |
| *G01S 13/58* | (2006.01) |
| *G06N 20/00* | (2019.01) |
| *G06V 40/20* | (2022.01) |
| *G07F 19/00* | (2006.01) |

(52) U.S. Cl.
CPC ............ *G06F 3/017* (2013.01); *G01S 13/583* (2013.01); *G06N 20/00* (2019.01); *G06V 40/28* (2022.01); *G07F 19/203* (2013.01); *G07F 19/207* (2013.01)

(58) Field of Classification Search
CPC ........ G06F 3/017; G01S 13/583; G01S 7/415; G01S 13/62; G01S 13/88; G01S 7/417; G06N 20/00; G06V 40/28; G07F 19/203; G07F 19/207; G07F 9/009; G07F 19/206; G06Q 20/18; G06Q 20/40145
See application file for complete search history.

(56) References Cited

U.S. PATENT DOCUMENTS

| | | | | |
|---|---|---|---|---|
| 6,633,280 | B1 * | 10/2003 | Matsumoto | G06F 3/0433 345/173 |
| 10,354,126 | B1 * | 7/2019 | Nagalla | G06Q 20/40145 |
| 11,221,680 | B1 * | 1/2022 | Clements | G06F 3/017 |
| 2016/0041617 | A1 * | 2/2016 | Poupyrev | G01S 13/04 345/156 |
| 2016/0378963 | A1 * | 12/2016 | Anderson | G06F 1/163 726/19 |

(Continued)

*Primary Examiner* — Tuyen K Vo
(74) *Attorney, Agent, or Firm* — Weiss & Arons LLP

(57) ABSTRACT

Apparatus and methods for contact-minimized automated teller machine ("ATM") use and transaction processing using Doppler-radar based gesture recognition and authentication. The apparatus and methods may include an ATM including a millimeter-wave radar transmitter and receiver. Movement of one or more objects, including fingers, within a radar field may be analyzed and translated into gestures and authentication passcode(s). By utilizing the radar field instead of physical buttons or a touchscreen, contact with the ATM may be minimized.

19 Claims, 9 Drawing Sheets

(56) References Cited

U.S. PATENT DOCUMENTS

2017/0097684 A1\* 4/2017 Lien ................. G06V 40/28
2019/0011534 A1\* 1/2019 Trotta ............... G06F 21/32
2020/0118397 A1\* 4/2020 Yang ................ G07F 19/207
2021/0043047 A1\* 2/2021 Newman ........... G06F 3/0445

\* cited by examiner

APPARATUS AND METHODS FOR CONTACT-MINIMIZED ATM TRANSACTION PROCESSING USING RADAR-BASED GESTURE RECOGNITION AND AUTHENTICATION

CROSS REFERENCE TO RELATED APPLICATION

This application is a continuation of U.S. patent application Ser. No. 17/140,170, filed on Jan. 4, 2021 and entitled "APPARATUS AND METHODS FOR CONTACT-MINIMIZED ATM TRANSACTION PROCESSING USING RADAR-BASED GESTURE RECOGNITION AND AUTHENTICATION," which is hereby incorporated by reference herein in its entirety.

FIELD OF TECHNOLOGY

This disclosure relates to apparatus and methods for contact-minimized automated teller machine use and transaction processing using Doppler-radar based gesture recognition and authentication.

BACKGROUND

Currently, in order to use an automated teller machine ("ATM"), or other interactive machines, customers must physically touch the ATM multiple times to complete a transaction. In a typical scenario, a customer must insert a bank card, enter a personal identification number ("PIN") or password, and select from a multitude of options. These entries are typically performed with a keypad or other buttons, and/or a touchscreen.

Each of these, and other, actions may constitute another physical contact with the ATM. Each physical contact may be unhygienic, as multiple users interact with an ATM before it may be cleaned. Further, with less physical contact, a financial institution may not have to clean an ATM or other interactive machine as often.

Therefore, it is desirable to provide apparatus and methods for contact-minimized processing of automated teller machine ("ATM") transactions utilizing doppler-radar based gesture recognition and authentication.

SUMMARY OF THE DISCLOSURE

It is an object of this disclosure to provide apparatus and methods for contact-minimized automated teller machine use and transaction processing using Doppler-radar based gesture recognition and authentication.

A contact-minimized automatic teller machine ("ATM") is provided. The ATM may include, among other things, a housing. The housing may include a microprocessor, a card reader, a screen, a cash dispenser, a radar transmitter, a radar receiver, a signal converter, memory, a digital signal processor ("DSP"), a power supply, and a communication circuit. All of these components may be electronically coupled to one or more of each other.

The card reader may be configured to read an ATM card, or other bank card. The card may be read by inserting the card into the card reader and reading data contained in a magnetic stripe or a through a near-field communication ("NFC") chip. Alternatively, the card reader may sense and read the card through any other appropriate methods, such as a wi-fi or Bluetooth signal.

In an embodiment, no ATM or bank card is necessary. A signal may be sent from a mobile device, e.g., from an application on a mobile device, including the necessary information so that the ATM may conduct a transaction without a physical ATM card. This information may include bank account information such as a routing number and account number, along with information on the owner(s) of the account.

In an embodiment, the screen may be configured to display various transaction options, such as withdraw $100, $120, $140 etc., check account balances, deposit a check or cash, transfer between accounts, and other transactions. The screen may also display any other information necessary to complete a transaction, such as instructions to a user.

The cash dispenser may dispense cash in any necessary amount. In an embodiment, the cash dispenser may be configured to receive cash and/or checks for deposit.

In an embodiment, the radar transmitter is a millimeter-wave radar transmitter. It may operate at a frequency between 3 gigahertz ("GHz") and 300 GHz. The radar transmitter may be configured to provide a pulsed or continuous radar field at a location in front of the housing. This location may begin within a few millimeters of the housing and extend as far as fifteen feet. The radar field may have a height, depth, and width. It may be preferable to have a radar field that begins one inch form the housing and extends to a depth of two feet. This smaller radar field may be more secure and may prevent attenuation by environmental effects such as rain and moisture.

The radar receiver may be configured to receive reflections from any large-enough object within the radar field. Objects that are too small may not reflect the waves of the radar field. Generally, objects one-half the size of the radar frequency may be too small to reflect the radar waves. In an embodiment, the radar receiver may receive reflections from individual fingers belonging to a hand of a user of the ATM.

The signal converter may be an analog-to-digital signal converter configured to convert analog radar reflections to digital data. Digital data may be easier to store, communicate, and interpret.

In an embodiment, the memory may be non-transitory memory, including one or both of random-access memory ("RAM") and read only memory ("ROM"). The memory may be configured to store an operating system to run the ATM and its components. The memory may also be configured to store the radar reflections and/or the digital data of the radar reflections.

In an embodiment, the ATM may include a digital signal processor ("DSP"). In an alternative embodiment, the DSP may be remote from the ATM, such as, e.g., on a remote server.

The DSP may be configured to analyze the radar reflections (in their digital data form) and identify any objects within the radar field that have caused radar reflections. In an embodiment, these objects may be individual fingers of a hand belonging to a customer using the ATM. Alternatively, the objects may be a stylus or other synthetic object.

Using a Doppler method and calculations, the DSP may analyze the movement of the objects, if any. The DSP may then convert the movement of each object into gestures and writing symbols. Gestures may include selecting one or more items on the screen, pinching in or out to zoom, swiping right or left, single or double-tapping, or any other appropriate gesture. Writing symbols may include letters, words, numerals, and symbols, and the DSP may translate the writing symbols into the appropriate letters, words, numerals and symbols. In an embodiment, these writing symbols may be used to authenticate a user and may be a passcode or PIN.

In an embodiment, the DSP may use machine-learning and deep-learning neural network algorithms to translate the writing symbols. Any appropriate machine-learning or deep-learning neural network algorithm may be used.

In an embodiment, the communication circuit may be configured to transmit and receive data including the digital data, gestures, words, numerals, and symbols. In alternative embodiments, the communication circuit may include a network interface card ("NIC"), a Bluetooth antenna, a cellular antenna, a wi-fi antenna, or any other appropriate antenna. A 5g-capable cellular antenna and communication circuit may be preferable to increase the speed of ATM transactions.

In an embodiment, the ATM may include an encryption controller. The encryption controller may allow for accurately authenticating the user/owner, as well as protecting the user/owner and financial institutions from users with malicious intent and/or fraud. In an embodiment, the non-transitory memory may include executable instructions and at least one datum configured to authenticate the user. These instructions and data may work in concert with, or separate from, any encryption controller.

Methods for contact-minimized interaction with an ATM are provided. The method may include the steps of sensing an ATM card and identifying, at the ATM, or through a remote server, a customer associated with the ATM card. By identifying the customer, the relevant bank account details may be ascertained.

Once an ATM card is sensed, the ATM may activate a Doppler millimeter-wave radar transmitter, which may then create a continuous-wave radar field in front of the ATM.

The ATM may then request the customer write an authentication passcode within the radar field. The customer may use his/her finger(s), a stylus, or another object. Finger(s) may be preferable.

The ATM may then receive, at a radar receiver, Doppler radar reflections from one or more objects within the radar field, such as the user's fingers.

The ATM, through an analog-to-digital signal converter or other appropriate methods, may digitize the Doppler radar reflections.

Next, the Doppler radar reflections may be processed by a digital signal processor ("DSP"). The DSP may be located at the ATM or may be at a location remote from the ATM. If the DSP is at a location remote from the ATM, the digital data must be sent to the DSP.

The DSP may then identify one or more targets, which may be all or a portion of the objects. For example, the DSP may identify discrete scattering targets, which may be each of the five fingers on a customer's hand.

The DSP may then resolve and analyze any movement of the target(s), using Doppler methods and data.

The DSP may then translate the movement of the target(s) into gestures, words, numerals, and symbols. In an embodiment, the ATM, through a communication circuit, may then send to an authentication server, the gestures, words, numerals, and symbols. The authentication server may then use the gestures, words, numerals, and symbols to authenticate the user, or not. The authentication server may authenticate the customer by matching the gestures, words, numerals, and symbols to a saved passcode belonging to the user.

In an alternative embodiment, the DSP, and not the ATM, may send the gestures, words, numerals, and symbols to an authentication server.

The authentication server may then inform the ATM if the customer has entered the correct passcode or note.

If the customer has entered the correct passcode, the ATM may then display various transaction options to the customer. The customer may then select and complete one or more transactions using one or more appropriate gestures within the radar field. The ATM may then process the transaction(s).

In an embodiment, the DSP may use one or more machine or deep-learning algorithms to identify the target(s), resolve the movement of the target(s), and translate the movement(s) into gestures, words, numerals, and symbols.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
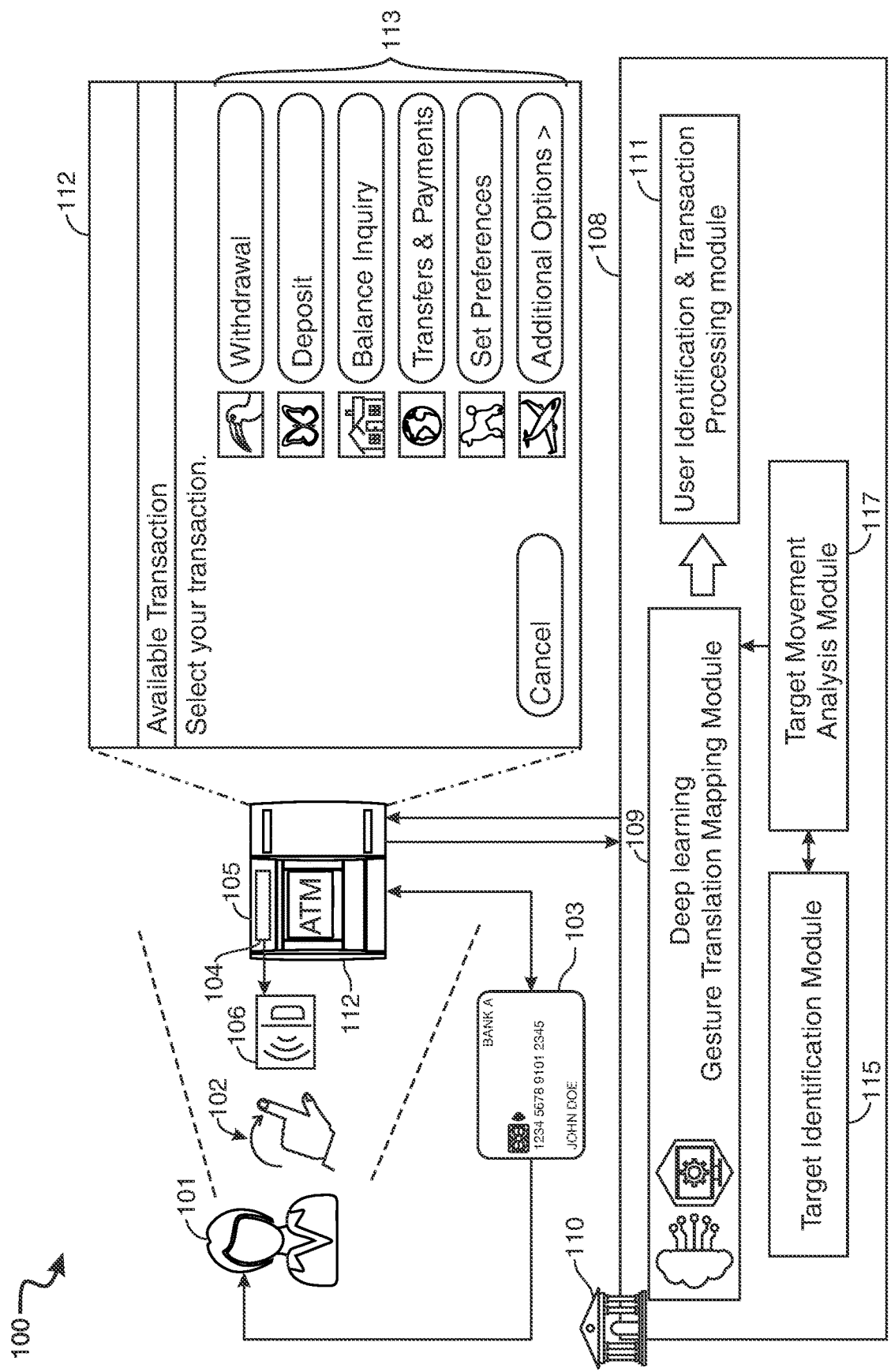
FIG. 1 shows an illustrative process schematic in accordance with the principles of the disclosure.

Apparatus and methods for a contact-minimized (or contactless) ATM are provided. The contact-minimized ATM may utilize doppler-radar based gesture recognition and authentication.

The contact-minimized ATM may include a housing. In addition to typical ATM components (such as, e.g., a screen, keypad, microprocessor, non-transitory memory, encryption and authentication circuit, communication circuit, card reader, money-holding container, and money-dispenser), the housing may include a radar system with components including a radar transmitter, a radar receiver, analog-to-digital signal converter, and a DSP. The communication circuit may enable 5g cellular service. Each of these components may be electronically coupled to one or more of each other.

The contact-minimized ATM may also include apparatus to remotely sense and read an ATM card. The ATM card may be an EMV (Eurocard, Mastercard, VISA) chip card. The ATM card may include an NFC chip or other communication circuit such as Bluetooth, cellular connection, or wi-fi.

The card may be read by inserting the card into the card reader and reading data contained in a magnetic stripe or a through a near-field communication ("NFC") chip. Alternatively, the card reader may sense and read the card through any other appropriate methods, such as a wi-fi or Bluetooth signal.

In an embodiment, no physical card may be necessary. For example, a customer may open a banking application on a mobile phone to initiate an ATM transaction. If the customer is within range of a contact-minimized ATM, the mobile phone application may take the place of a physical ATM card. The data sent from the mobile phone application may include the necessary information so that the ATM may conduct a transaction without a physical ATM card. This information may include bank account information such as a routing number and account number, along with information on the owner(s) of the account.

In an embodiment, the screen may be configured to display various transaction options, such as withdraw $100, $120, $140 etc., check account balances, deposit a check or cash, transfer between accounts, and other transactions. The screen may also display any other information necessary to complete a transaction, such as instructions. The screen may also display any error codes and may preferably include options for navigating the ATM via gestures or the standard keypad.

The cash dispenser may dispense cash in any necessary amount. In an embodiment, the cash dispenser may be configured to receive cash and/or checks for deposit.

In an embodiment, the radar transmitter and radar receiver may be monostatic, i.e., they may use the same antennae, or their respective antennae may be adjacent to one another. In another embodiment, the radar transmitter and radar receiver may be quasi-monostatic, wherein the antennae are within approximately three feet of each other.

In an embodiment, the radar transmitter is a millimeter-wave radar transmitter. It may operate at a frequency between 3 gigahertz ("GHz") and 300 GHz. The radar transmitter may be configured to provide a pulsed or continuous radar field at a location in front of the housing. This location may begin within a few millimeters of the housing and extend as far as fifteen feet. The radar field may have a height, depth, and width. It may be preferable to have a radar field that begins one inch form the housing and extends to a depth of two feet. This smaller radar field may be more secure and may prevent attenuation/signal loss by environmental effects such as rain and moisture.

In an embodiment, the housing may include external walls and a roof surrounding and exceeding the radar field. These walls and roof may provide security to a customer as well as protect the ATM from environmental effects. For example, the ATM may be placed at one end of an enclosed room that is larger than the radar field.

In various embodiments, the radar transmitter may be a continuous-wave Doppler radar. The radar may operate on the "millimeter-band," i.e., between 30-300 GHz. At 30 GHz the radar's wavelength may be 10 mm, and at 300 GHz, the radar's wavelength may be 1 mm. Alternatively, the radar may operate between 3 and 30 GHz, in the "microwave band." The smaller the wavelength the greater the resolution the radar may have. However, at a smaller wavelength the radar may detect extra erroneous objects and overwhelm the signal processor. It may be preferable to operate at a wavelength between 1 and 10 mm.

The radar transmitter may operate at a power up to 1000 W, although lower power outputs may be safer. The higher the power, the more range the radar may have. A preferred power level may depend on the preferred range.

In an embodiment the radar transmitter may have a range between 1 inch and 15 feet.

In an embodiment, the radar transmitter may be a frequency-modulated continuous wave Doppler radar. Alternatively, the radar transmitter may be a pulse Doppler with a medium to high pulse repetition frequency ("PRF"). Alternatively, the radar transmitter may be able to operate in multiple modes, and a particular mode may be chosen by the ATM depending on environmental conditions or other factors.

In an embodiment, the DSP may be configured to identify and track the movement of human fingers or fingertips in the air. These movements may form gestures or writing. Alternatively, the DSP may be configured to also sense and track the movement of an object such as a stylus or a metallic pin.

The radar receiver may be configured to receive any radio waves reflected by an object such as a finger, a fingertip, a hand, multiple fingers, and/or a different object, and process the reflections using the digital signal processor. The radar receiver may be configured to receive reflections from any large-enough object within the radar field. Objects that are too small may not reflect the waves of the radar field. Generally, objects one-half the size of the radar frequency may be too small to reflect the radar waves. In an embodiment, the radar receiver may receive reflections from individual fingers belonging to a hand of a user of the ATM.

In an embodiment, the analog-to-digital signal converter may convert the received signals to digital data, and the DSP may perform various calculations on the digital data. Such calculations may include Doppler-effect calculations to determine the movement performed by the object. Other calculations may include range and velocity.

In an embodiment, the DSP may include a target identification module, a gesture sensing module, a gesture translation module, a user identification module, a user authentication module, and/or a transaction processing module. In another embodiment, one or more of the target identification module, gesture sensing module, gesture translation module, user identification module, user authentication module, and transaction processing module may be separate from the DSP.

In an embodiment, one or more of the target identification module, gesture sensing module, gesture translation module, user identification module, user authentication module, and transaction processing module may be referred to as a part of a feature extraction and translation engine. In an embodiment, the feature extraction and translation engine is another term for the DSP. In an embodiment, the feature extraction and translation engine is a part of the DSP.

In an embodiment, the DSP or feature extraction and translation engine may disregard objects with a size outside of a predetermined range. For example, the DSP or feature extraction and translation engine may disregard any objects with an area that is smaller than 1 mm^2 or larger than 5 cm^2.

In an embodiment, the DSP or one or more of the target identification module, gesture translation module, user identification module, and user authentication module may be located on a remote server. The ATM and/or its components may communicate with the remote server using wi-fi, LAN, WAN, internet connectivity, cellular networks, and/or 5G networks. Using 5G networks and communication protocols may enable faster processing of transaction and authentication requests.

In an embodiment, the gesture translation module may translate various gestures performed by a user to manipulate and use the ATM. Such gestures may include a pinch to change the screen size, a swipe left or right to change screens, a tap to select an object on the ATM screen, or other gestures. The ATM may display instructions to a user on how to perform gestures and which gestures perform particular actions. In an embodiment, a user is taught these gestures before using the ATM for a first time. For example, a user may be given instructions when opening an account at a financial institution.

In an embodiment, the gesture translation module, or another module, may translate gestures performed by a user as letters, words, numbers and symbols. Such gestures may be used to authenticate the user and may act as a written password or passcode.

The gesture translation module may utilize machine learning and deep-learning algorithms, such as, e.g., convolutional neural networks and random forest, to translate gestures into actions, letters, numbers, and/or symbols.

Such machine learning algorithms may be utilized at the time a user is interacting with an ATM. In an embodiment, a gesture translation module may have been trained with machine learning algorithms before a user has interacted with an ATM. This training may utilize sample data sets or prior data from the user.

In an embodiment, the gesture translation module, or another module, may be able to recognize a user's distinct handwriting and handwriting style. This recognition may be useful in authenticating the user.

In an embodiment, a user may perform a pre-determined gesture, or write a pre-determined phrase or word, to indicate authenticity of a proposed transaction, or indicate that the user requires assistance. For example, a user may write "help" or "call 911" if the user requires assistance.

In an embodiment, the communication circuit may be configured to transmit and receive data including the digital data, gestures, words, numerals, and symbols. In alternative embodiments, the communication circuit may include a network interface card ("NIC"), a Bluetooth antenna, a cellular antenna, a wi-fi antenna, or any other appropriate antenna. A 5g-capable cellular antenna and communication circuit may be preferable to increase the speed of ATM transactions.

In an embodiment, the ATM may include an encryption controller. The encryption controller may allow for accurately authenticating the user/owner, as well as protecting the user/owner and financial institutions from users with malicious intent and/or fraud. In an embodiment, the non-transitory memory may include executable instructions and at least one datum configured to authenticate the user. These instructions and data may work in concert with, or separate from, any encryption controller.

Methods for processing ATM transactions using radar-based gesture recognition and authentication are provided.

A customer may process transactions through an ATM without physically touching the ATM, or by minimizing the number of touches. The ATM may sense the customer's ATM or bank card through radar sensing, visual sensing with a camera, a near-field communication ("NFC") circuit, magnetic sensing or some other method. In an embodiment, a user may activate the ATM through a mobile phone application instead of an ATM card.

After the ATM senses the presence of a customer and the customer's ATM or bank card (or mobile phone application), the ATM may enable a screen and display various options.

Before the customer may process any transaction through the ATM, the customer must be authenticated. The ATM may prompt the customer to enter a passcode or PIN. At this time, and in an embodiment, after the ATM senses the presence of the customer's ATM or bank card, the ATM may begin generating a Doppler continuous-wave radar field using radar components such as a transmitter, receiver, signal converter, and DSP.

In an embodiment, the radar field extends only for a few inches away from the ATM. In another embodiment, the radar field may extend as far as 15 feet away from the ATM. These ranges may be achieved by modulating the power output from the transmitter (i.e., less power equals less range).

In an embodiment, the passcode or PIN may be a particular gesture instead of a combination of numbers and letters. For example, a user may draw a shape in a particular manner (e.g., clockwise or counterclockwise, or right-handed vs. left-handed) and/or in a particular size. Every unique aspect of the gesture may be useful in authenticating the user.

To enter a passcode or PIN, the customer may write the passcode or PIN in the air, within the radar field, and without touching the ATM. The customer may use one or more fingers, a whole hand, or an object such as a stylus or pen.

As the radar field is being generated by a continuous-wave radio-frequency ("RF") signal (and in an embodiment, by a pulsed radio-frequency signal), any object within the field larger than one-half the wavelength of the RF signal should preferably reflect the RF signal back to a receiver. The signal converter may convert these reflections into digital data which may then be sent to the DSP and/or various modules such as, e.g., a gesture sensing module, gesture translation module, user identification module, user authentication module, and transaction processing module. These modules may be a part of or separate from the DSP. These modules may be referred to as a feature extraction and translation engine. In an embodiment, the DSP and the modules are a part of the ATM. In an alternative embodiment, the DSP and the modules are at a location remote from the ATM.

By analyzing the reflected data, the feature extraction and translation engine (in an embodiment, this may be referred to as the DSP) may identify discrete scattering centers, i.e., discrete objects reflecting RF waves within the radar field. In an embodiment, these discrete scattering centers may be separate fingertips (or whole fingers) on the user's hand. Alternatively, these discrete scattering centers may be a combination of one or more objects (such as a stylus) and fingers.

As the radar field is being generated by a RF signal, the movement of any discrete scattering centers within the field should preferably create a Doppler effect in the reflected RF signal. By analyzing the Doppler effect, the DSP/feature extraction and translation engine may track and record the movements of the object(s). Multiple objects may be tracked at any time, although tracking more objects may require more processing power. The movements of the object over time may be converted into a digital image (such as a heatmap, line, curve, or combination thereof). The digital image of the movements may be analyzed to identify a gesture or writing pattern, if any. This analysis may be performed using machine or deep-learning algorithms.

In an embodiment, the writing pattern may be mapped, using a machine learning algorithm, to a language, such as English, to determine if the customer wrote letters, numbers, and/or symbols, and to determine what letters, numbers, and/or symbols the customer wrote within the radar field. For example, when prompted to enter a password, the customer may write Password123! Within the radar field. In an alternative embodiment, instead of writing letters, numbers, and symbols, the customer may draw a unique image or gesture in the air in lieu of a password or PIN.

In an embodiment, the converting of the movements, identification of a writing pattern, and mapping to a language may be performed using deep neural machine learning or other algorithms. One or more of these steps may be performed locally at the ATM or the data may be transferred to a remote server with additional computing power.

In an embodiment, the results are sent to an external authentication server to authenticate the user/customer. In another embodiment, the authentication server may be a part of the DSP.

The authentication results may be sent back to the ATM. If the customer/user is authenticated, the ATM may continue with various transactions. If the user/customer is not authenticated, the ATM may block any transactions and may alert the customer, the financial institution, and/or the police, as necessary.

The digital data transfer (in both directions) may be sent over any suitable communications network, including 5G cellular networks.

In an embodiment, the unique way a customer writes or draws may be used to authenticate the user in lieu of, or in addition to, the password or PIN itself. For example, when opening a bank account, the financial institution may require the customer to write a password within a radar field for future authentication purposes. This initial interaction may be recorded and saved by the financial institution's authentication servers as part of the customer's profile.

After authentication/validation of the customer, the customer may use various gestures to perform any typical transaction with the ATM (such as disbursing cash, making a deposit, checking balances etc.). A final gesture may terminate the transaction(s), or the transaction(s) may be terminated by the user withdrawing to a location that is beyond the range of the radar.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative process schematic of a method for contact-minimized ATM use and transaction processing using Doppler-radar based gesture recognition and authentication, in accordance with the principles of the disclosure. FIG. 1 contains both illustrative steps and numbered components.

Contact-minimized ATM use and transaction processing method 100 may include an ATM user/customer 101 with a bank card 103 belonging to the user/customer 101. A contact-minimized ATM 105 may include a radar system 104. Radar system 104 may include a radar transmitter configured to send out radar signals to create a radar field 106, along with a radar receiver, signal converter, and a DSP. The ATM 105 may also include a screen 112. The screen 112 may display multiple transaction and other options 113 to the user 101.

After the ATM 105 senses the customer's 101 ATM card 103, it may activate the radar 104 and create a radar field 106. The customer 101 may write in the air (radar field 106)/gesture 102 using the customer's 101 finger or some other object such as a stylus or pen. The radar system 104 may receive Doppler signals reflected from the gesture 102 and store the signals in memory (not shown). The signals may also be converted from analog to digital data through an analog-to-digital converter (not shown). The gesture 102 may be an authentication passcode or instruction gesture(s) directing a transaction at the ATM 105.

In an embodiment, the digital data may be sent to a DSP 108 located remotely from the ATM 105 on a server at financial institution 110. Alternatively, the DSP 108 may be located at the ATM 105 (location at ATM not shown).

The DSP 108 may include various modules. For example, the DSP 108 may include a target identification module 115, a target movement analysis module 117, a deep-learning gesture translation mapping module 109, and a user identification, authentication, and transaction processing module 111. In an embodiment, some of these modules may be separate from the DSP 108.

The target identification module 115 may be configured to identify objects in the radar field 106, such as a finger or fingers of the customer 101. The target movement analysis module 117 may be configured to analyze the movement of one or more identified targets using Doppler methods and calculations. The DSP may then use the translation mapping module 109 to map the movement(s) of the targets to gestures, words, letters, numbers and symbols. These gestures, words, letters, numbers and symbols may be sent to the identification, authentication and transaction processing module 111. At module 111, the user 101 may be authenticated and gestures indicating actions desired (e.g., transactions) may be determined.

At the next step, results from the DSP may be sent to the ATM 105. If the user 101 is not authenticated, further transactions may be blocked by the ATM 105. If the user 101 is authenticated, the user may use various gestures 102 in the radar field 106 to manipulate and choose from among the transaction options 113 shown on screen 112. These gestures 102 may be sent to the DSP 108 for translation and mapping, with the results shared with the ATM 105.

Figure 2:
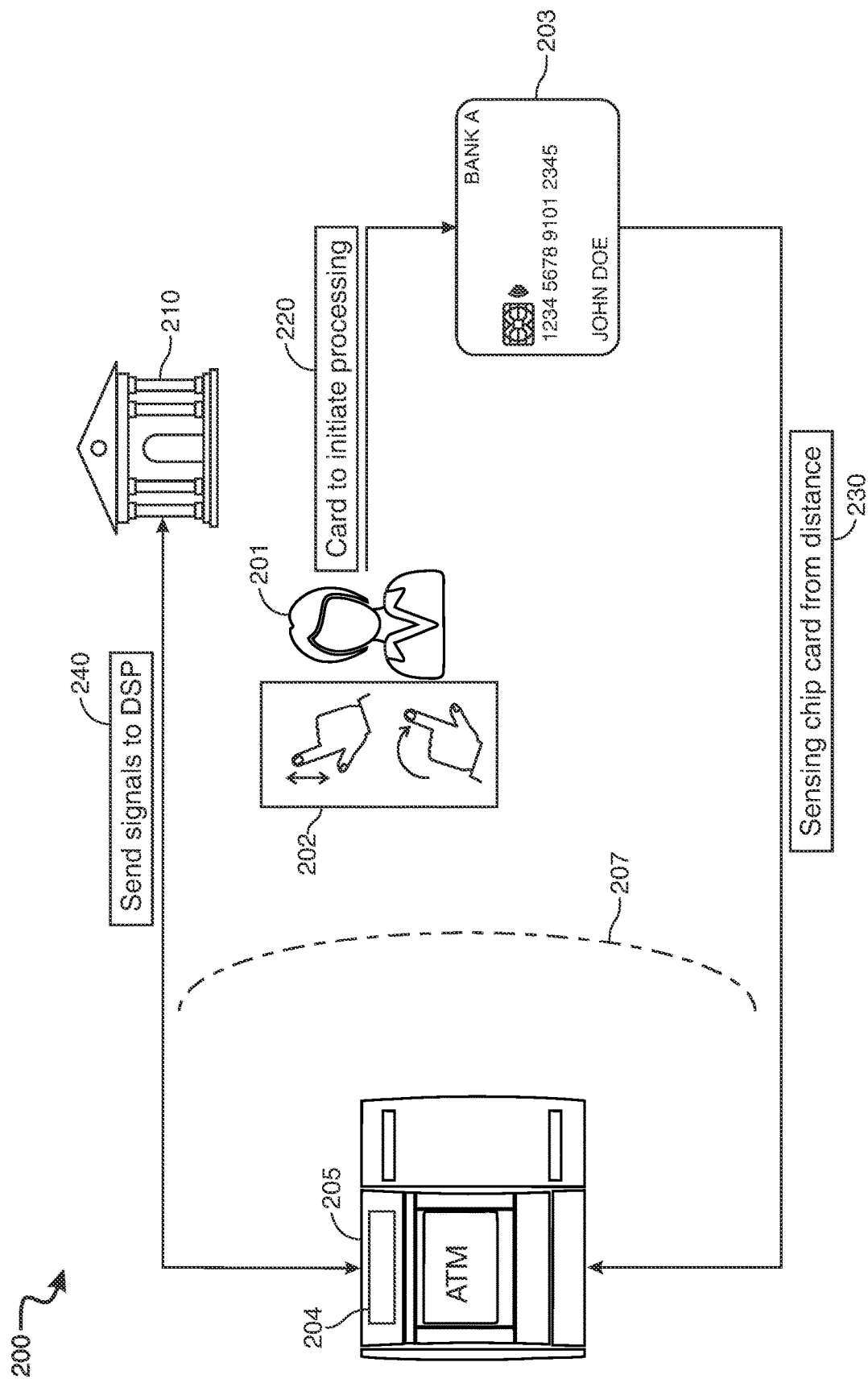
FIG. 2 shows an illustrative process schematic in accordance with the principles of the disclosure.

FIG. 2 shows an illustrative process schematic of a method for contact-minimized ATM use and transaction processing using Doppler-radar based gesture recognition and authentication, in accordance with the principles of the disclosure. FIG. 2 contains both illustrative steps and numbered components.

Contact-minimized ATM use and transaction processing method 200 may include an ATM user/customer 201 with a bank card 203 belonging to the user/customer 101. At step 220, the customer 201 may use the bank card 203 to initiate an ATM transaction. At step 230, the contact-minimized ATM 205 may sense the ATM card 203 from a distance using a variety of methods. The ATM 205 may sense the card 203 via an NFC chip, Bluetooth signal, wi-fi signal, or other method.

In an embodiment, the ATM 205 may generate a radar field (not shown) from Doppler radar 204 and prompt the user 201 to enter an authentication passcode within the radar field. The user 201 may use one or more fingers or an object such as a stylus to write a passcode using gestures 202 within the radar field. (Dotted line 207 represents that there is a distance between the physical location of the user 201 and the physical location of the ATM 205.)

At step 240, the ATM 205 may send the received signals from gestures 202 to a DSP (not shown) located remote from the ATM 205 at bank 210. The DSP may analyze the received signals to authenticate the user as well as determine what transaction(s) the user is attempting to complete. The DSP may perform this analysis using various modules (not shown) as described above.

Figure 3:
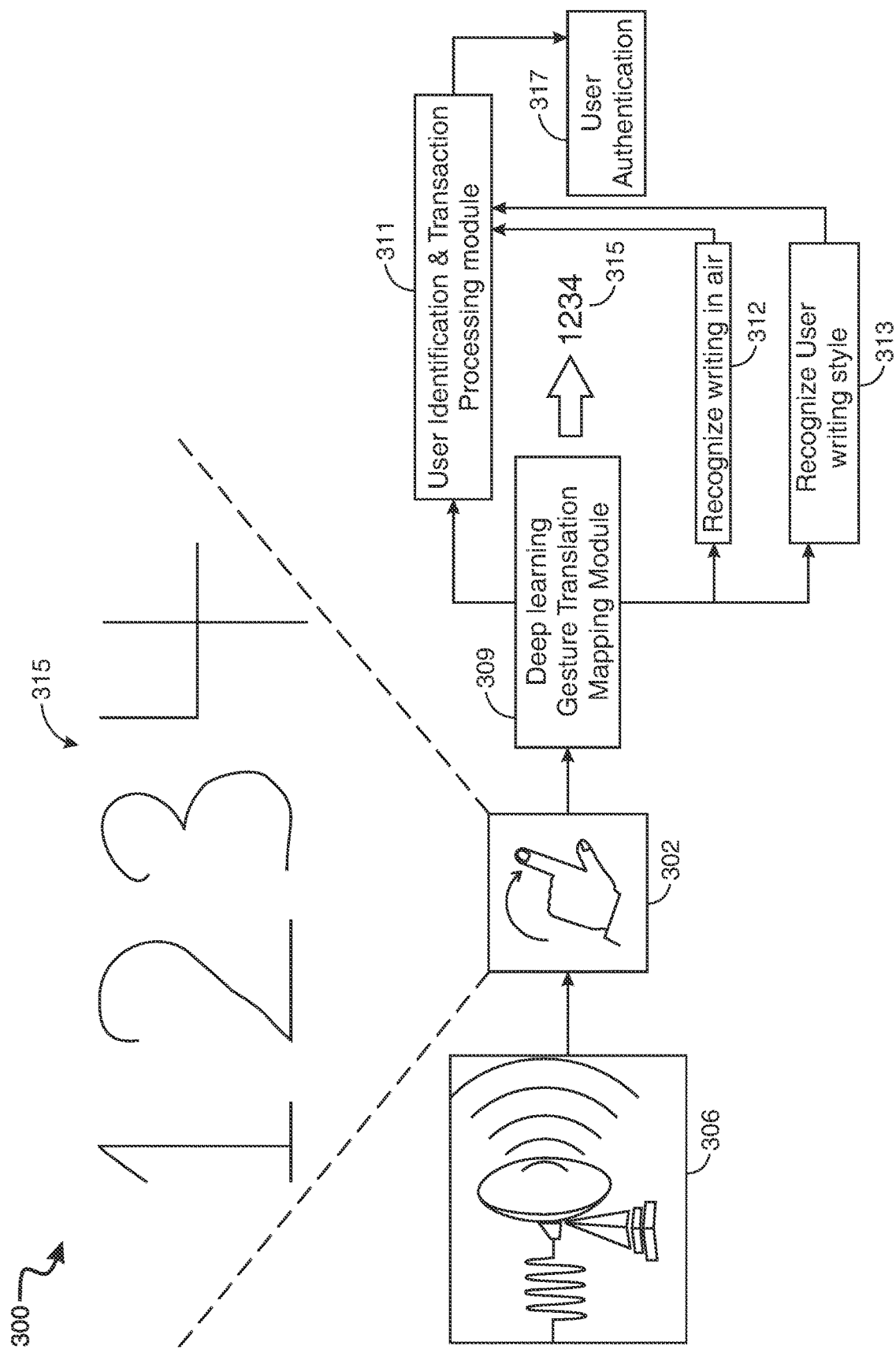
FIG. 3 shows an illustrative process schematic in accordance with the principles of the disclosure.

FIG. 3 shows an illustrative process schematic of a method for contact-minimized ATM use and transaction processing using Doppler-radar based gesture recognition and authentication, in accordance with the principles of the disclosure. FIG. 3 contains both illustrative steps and numbered components.

Contact-minimized ATM use and transaction processing method 300 may include generating a radar field 306. A user may write 302 an illustrative passcode 315 within the radar field 306. The radar reflections, such as illustrative passcode 315, may be analyzed by a DSP (not shown) which includes a machine or deep-learning gesture translation and mapping module 309. The gesture translation mapping module 309 may recognize 312 the writing 302 in the air. In addition, translation and mapping module 309 may recognize 313 a customer's distinctive writing 302 style and quirks. Distinctive writing 302 style and quirks may be associated with a particular user as part of an authentication protocol.

After the gesture translation and mapping module 309 analyzes the writing 302, the data generated (including distinctive style, gestures, numbers, letters, and/or symbols) may be sent to a user identification and transaction processing module 311. If the data generated matches the data associated with the user, the user may be authenticated 317, and may continue to use the ATM. If the user is not authenticated, any attempted transaction with the ATM may be rejected.

Figure 4:
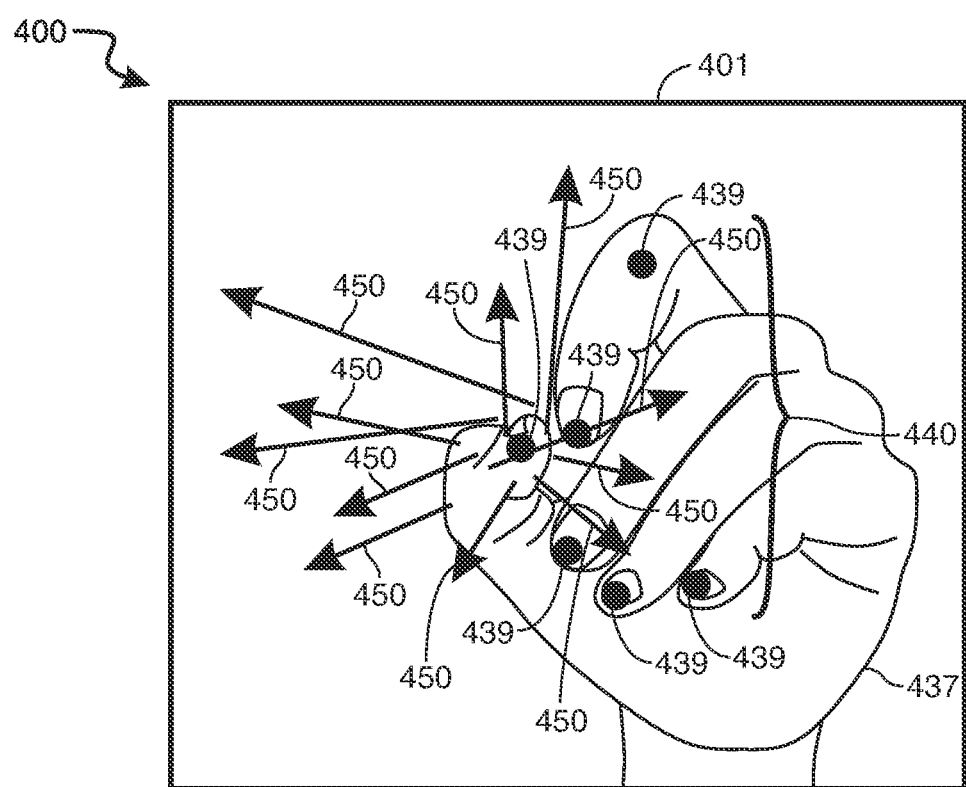
FIG. 4 shows an illustrative image resulting from a radar field in accordance with the principles of the disclosure.

FIG. 4 shows an illustrative image resulting from an object within a radar field, in accordance with the principles of the disclosure.

Radar field 400 may produce an illustrative snapshot image 401 at a particular time. Illustrative hand 437 may be within the radar field 400. Hand 437 may be an object within the radar field 400 and may also include a subset of further objects 440 as portions of the hand 437. A DSP may analyze the snapshot image 401 and identify particular targets 439 from the set of objects 440 (and hand 437). In this illustrative image, the particular targets 439 may be individual fingers of hand 437. Each target 439 may generate its own radar reflections 450.

In an embodiment, a DSP may analyze multiple snapshot images 401 to identify targets 439 from objects 440 and track and analyze the movement of targets 439 over time by mapping the radar reflections 450 using a Doppler or other method. The DSP may then translate and map the movement into gestures, words, letters, numbers, and/or symbols.

In an embodiment, the DSP, a different module or server may associate the gestures, words, letters, numbers, and/or symbols with a particular customer to authenticate the customer. In addition, the DSP, a different module or server may associate the gestures, words, letters, numbers, and/or symbols with a particular transaction the customer may choose to perform at the ATM.

Figure 5:
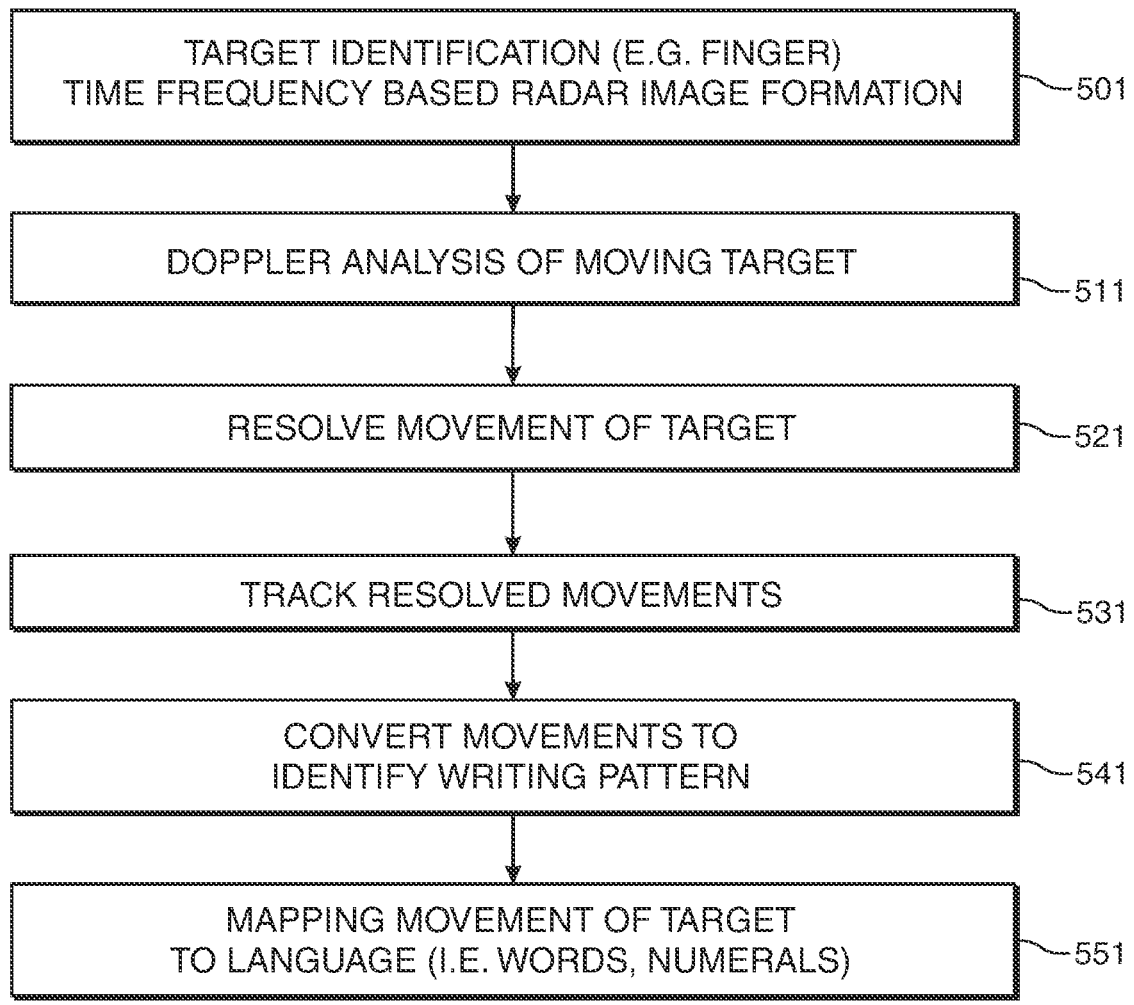
FIG. 5 shows an illustrative method in accordance with the principles of the disclosure.

FIG. 5 shows an illustrative method in accordance with the principles of the disclosure. Methods may include some or all of the method steps 501-551. Methods may include the steps illustrated in FIG. 5 in an order different from the illustrated order. The illustrative method shown in FIG. 5 may include one or more steps performed in FIGS. 1-3, or described herein.

At step 501, a DSP or feature extraction and translation engine may identify one or more target(s) from a plurality of objects that have reflected radio waves within a radar field. At step 511, the DSP may analyze any movement of the target(s) over time using Doppler methods and calculations. For example, the DSP may analyze the movement of each target by comparing snapshots of the radar field taken at specific intervals (e.g., every five milliseconds).

At step 521, the DSP may resolve the movement of the target(s) and at step 531, the DSP may track the movement. Steps 511, 521, and 531 may allow the DSP to convert the movement into a pattern to identify writing at step 541. The writing may include gestures, letters, numbers, and/or symbols.

At step 551, the DSP may use machine and deep-learning algorithms to map the converted movement to a particular language to determine what was actually written. At this point, what was written within the radar field may be an authentication passcode or directions. In an embodiment, the mapped movement to language may be sent to an authentication server for authenticating the customer. The mapped movement to language may also be sent to the ATM or other server to direct one or more ATM transactions. In an embodiment, language includes gestures such as pinching to zoom in or out, pressing to select an option, swiping to move screens or other gestures.

Figure 6:
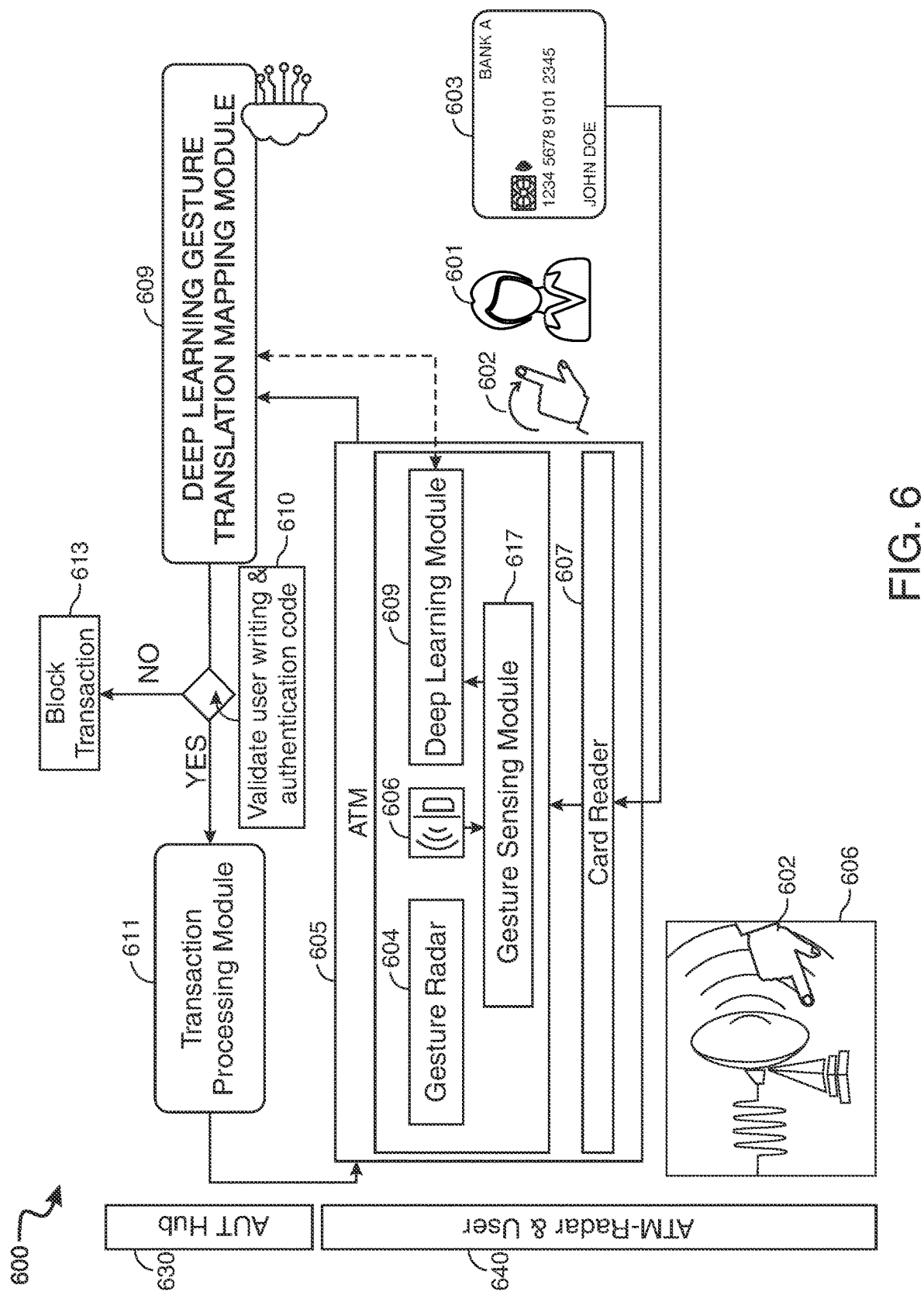
FIG. 6 shows an illustrative process schematic in accordance with the principles of the disclosure.

FIG. 6 shows an illustrative process schematic of a method for contact-minimized ATM use and transaction processing using Doppler-radar based gesture recognition and authentication, in accordance with the principles of the disclosure. FIG. 6 contains both illustrative steps and numbered components.

Contact-minimized ATM use and transaction processing method 600 may include an authorization hub 630 and an ATM radar and user 640. Authorization hub 630 may include a transaction processing module 611, a deep learning gesture translation mapping module 609, other modules, and process steps. ATM radar and user 640 may include a user 601, a radar field 606, an ATM 605, a target moving analysis/gesture sensing module 617, a card reader 607, a bank card 603, and user gestures/movements 602, among other components and process steps. Authorization hub 630 and ATM radar and user 640 may communicate with each other using a communication circuit (not shown), using any suitable communication method, including 5g cellular communications.

Method 600 may include a customer/user 601 inserting a bank card 603 into a card reader 607 in an ATM 605 to initiate a transaction. In alternative embodiments, the card reader may utilize an NFC chip instead of physically inserting the card. Alternatively, no card may be necessary, and a user may instead initiate a transaction though a different method, such as through a mobile phone application.

After initiating a transaction, the ATM 605 may activate a gesture radar 604 which may transmit a radar field 606. The ATM 605 may prompt the customer 601 to enter an authentication passcode. The customer 601 may then perform one or movements 602 in the radar field 606, such as writing a passcode.

A target movement analysis module/gesture sensing module 617 may analyze the movement(s) 602 to identify targets to track. The tracked movements 602 may then be communicated with a machine and deep learning gesture translation mapping module 609 to determine what, if anything, the customer 601 wrote with movement(s) 602. In alternative embodiments, the deep learning gesture translation mapping module 609 may be a part of ATM 605 or it may be remote from the ATM 605. The deep learning gesture translation mapping module 609 may be a part of a DSP and it may be a part of feature extraction and translation engine.

At step 610, the translated movement(s) 602 may be used to validate and authenticate the customer 601. For example, if the customer 601 wrote with movement(s) 602 a correct passcode, a transaction processing module 611 may be activated. If the customer 601 did not write a correct passcode, any attempted transaction may be blocked 613. Passcodes may be gestures, numbers, letters, symbols, shapes, a specific style of movement(s) 602, or a combination thereof.

Figure 7:
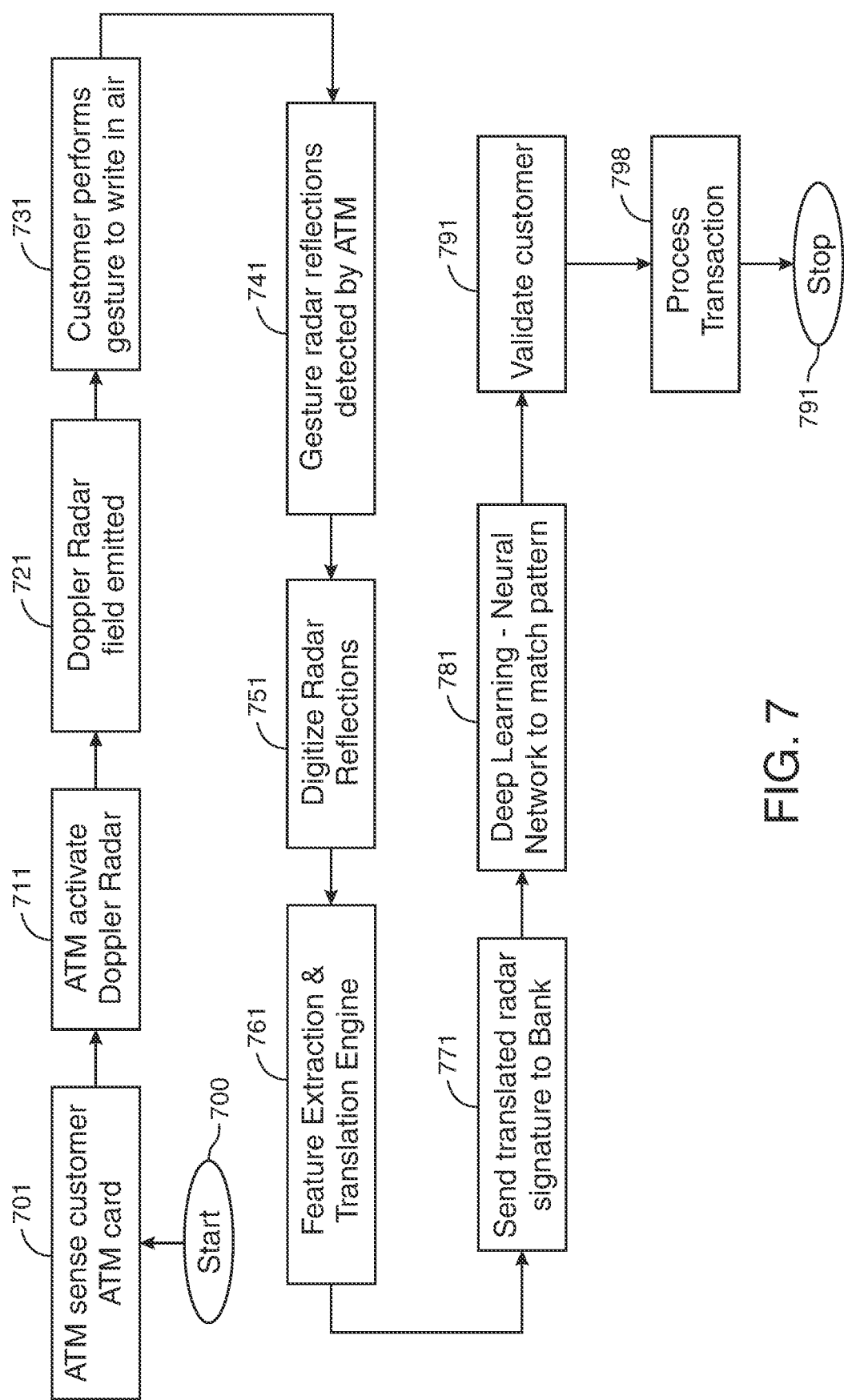
FIG. 7 shows an illustrative method in accordance with the principles of the disclosure.

FIG. 7 shows an illustrative method in accordance with the principles of the disclosure. Methods may include some or all of the method steps 701-799. Methods may include the steps illustrated in FIG. 7 in an order different from the illustrated order. The illustrative method shown in FIG. 7 may include one or more steps performed in FIGS. 1-3, and 5-6 or described herein.

The method may begin at step 700. At step 701, an ATM may sense a customer's ATM card. In alternative embodiments, the customer may insert the card into a card reader, tap the card and utilize an NFC chip, may use a pseudo card such as appears in various phone applications, or the customer may use a mobile phone application instead of an ATM card.

Next, at step 711, the ATM may activate a Doppler radar transmitter. At step 721, the Doppler radar transmitter may emit a radar field. Next, at step 731, the customer may perform one or more gestures to 'write' in the air within the radar field. The customer may use one or more fingers or an object such as a stylus.

Next, at step 741, the ATM may detect the gesture(s) performed by the customer in step 731. Preferably, the ATM will receive radar reflections from the customer's fingers or object(s) used to write in the air in step 731. At step 751 the ATM may digitize the radar reflections received in step 741. This may be accomplished with an analog-to-digital signal converter. The analog-to-digital signal converter may use a Fourier transform method to convert the signal to digital data.

Next, the digital data from step 751 may be sent to a feature extraction and translation engine at step 761. The feature extraction and translation engine may be a DSP. In an embodiment, steps 501-541 from FIG. 5 may be the process used by the feature extraction and translation engine. Alternative methods may be used to extract the features of the radar reflections and translate the features.

Once the features are extracted and translated to gestures, words, letters, numbers, or symbols, the translated radar signature may be sent to a bank or financial institution in step 771. Next, at step 781, machine/deep learning algorithms may be used to analyze the translated radar signature and match it to the customer's passcode. If the radar signature matches the customer's passcode, the customer may be validated at step 791. If the customer is validated, the ATM may be authorized to process a transaction selected by the customer at step 798. Once the transaction is complete the ATM may de-activate the radar and stop any further transactions, at step 799.

Figure 8:
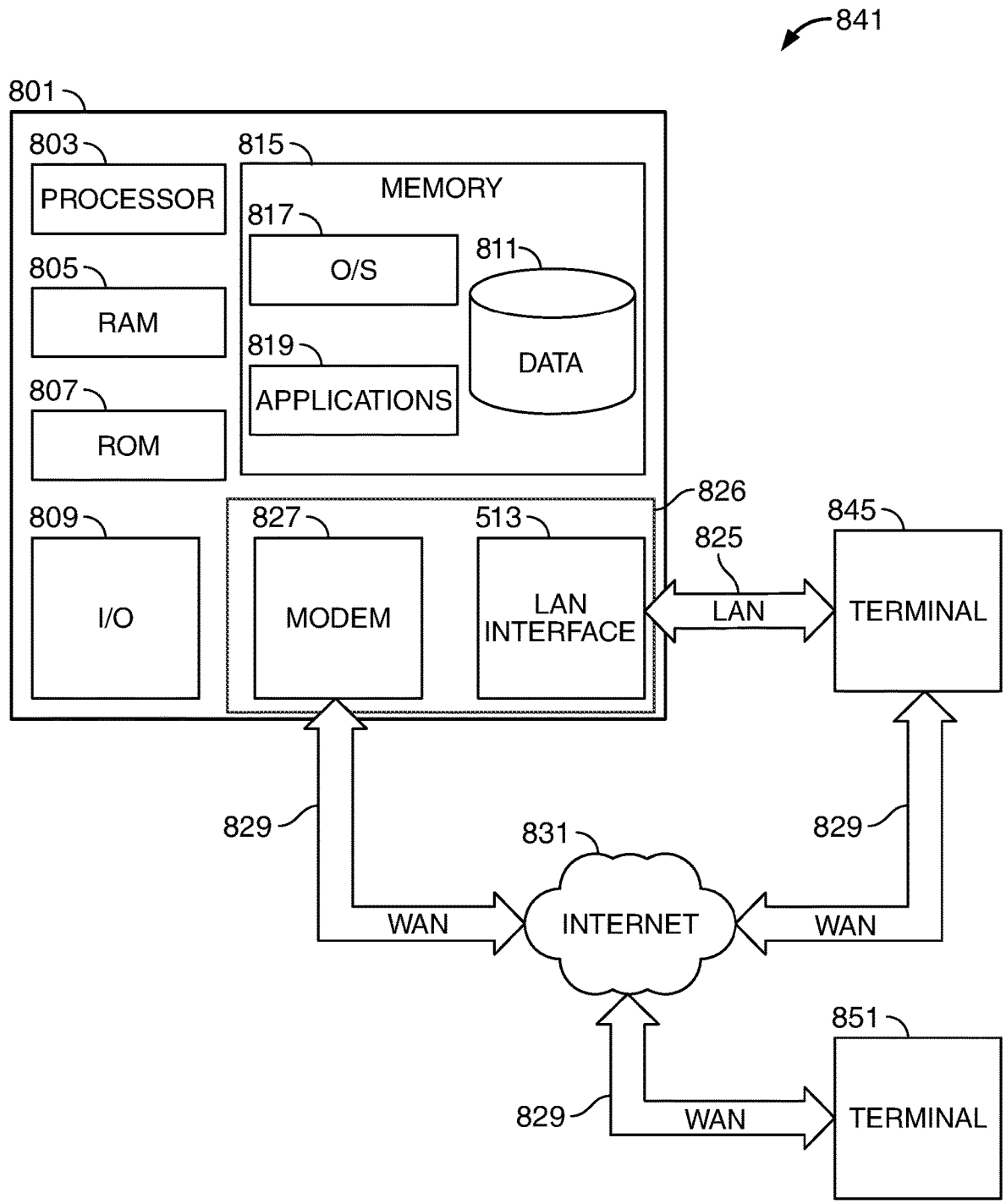
FIG. 8 shows an illustrative system in accordance with the principles of the disclosure.

FIG. 8 shows an illustrative block diagram of apparatus 841 that includes an ATM computing device 801. ATM computing device 801 may alternatively be referred to herein as a "control circuit." Elements of apparatus 841, including computing device 801, may be used to implement various aspects of the apparatus and methods disclosed herein. A "user" of apparatus 841 or control circuit 801 may include other computer apparatus or servers, such as an authentication server.

Computing device 801 may have a microprocessor 803 for controlling the operation of the device and its associated components, and may include RAM 805, ROM 807, input/output module 809, and a non-transitory memory 815. The microprocessor 803 may also execute all software running on the computing device 801—e.g., the operating apparatus. Other components commonly used for computers, such as EEPROM or Flash memory or any other suitable components, may also be part of the control circuit 801.

The memory 815 may be comprised of any suitable permanent storage technology—e.g., a hard drive or other non-transitory memory. The ROM 807 and RAM 805 may be included as all or part of memory 815. The memory 815 may store software including the operating system 817 and application(s) 819 along with any other data 811 needed for the operation of the apparatus 841. Memory 815 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The microprocessor 803 may execute the instructions embodied by the software and code to perform various functions.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

In an embodiment of the computing device 801, the microprocessor 803 may execute the instructions in all or some of the operating system 817, any applications 819 in the memory 815, and any other code embodied in hardware or firmware (not shown).

An input/output ("I/O") module 809 may include connectivity to a keypad, a touchscreen, a radar transmitter and receiver, or network interface through which higher hierarchal server or a user of apparatus 841 may provide input. The input may include input relating to cursor movement. The input/output module 809 may also include one or more speakers for providing audio output and a video display device, such as an LED screen and/or touchscreen, for providing textual, audio, audiovisual, and/or graphical output (not shown). The input and output may be related to results using and interacting with an ATM.

Apparatus 841 may be connected to other apparatus, computers, servers, and/or the internet via a local area network (LAN) interface 813.

Apparatus 841 may operate in a networked environment supporting connections to one or more remote computers and servers, such as terminals 845 and 851, including, in general, the internet and "cloud". References to the "cloud" in this disclosure generally refer to the internet. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 845 and 851 may be personal computers or servers that include many or all of the elements described above relative to apparatus 841. The network connections depicted in FIG. 8 include a local area network (LAN) 825 and a wide area network (WAN) 829 but may also include other networks, such as a cellular network. Computing device 801 may include a NIC 826, which may include a modem 827 and LAN interface or adapter 813, as well as other components and adapters (not shown). When used in a LAN networking environment, computing device 801 is connected to LAN 825 through a LAN interface or adapter 813. When used in a WAN networking environment, computing device 801 may include a modem 827 or other means for establishing communications over WAN 829, such as Internet 831. The modem 827 and/or LAN interface 813 may connect to a network via an antenna (not shown). The antenna may be configured to operate over Bluetooth, wi-fi, cellular networks (including 5G), or other suitable frequencies.

It will be appreciated that the network connections shown are illustrative and other means of establishing a communications link between computers may be used. The existence of various well-known protocols such as TCP/IP, Ethernet, FTP, HTTP and the like is presumed, and the apparatus can be operated in a client-server configuration to permit a user to retrieve web pages from a web-based server. The web-based server may transmit data to any other suitable computer apparatus. The web-based server may also send computer-readable instructions, together with the data, to any suitable computer apparatus. The computer-readable instructions may be to store the data in cache memory, the hard drive, secondary memory, or any other suitable memory.

Application program(s) 819 (which may be alternatively referred to herein as "plugins," "applications," or "apps") may include computer executable instructions for invoking user functionality related to performing various tasks such as interacting with an ATM. In an embodiment, application program(s) 819 may be cloud-based applications. The various tasks may be related to authenticating a user and processing one or more ATM transactions.

Computing device 801 may also include various other components, such as a battery (not shown), power supply (not shown), radar components (not shown), screen (not shown), speaker (not shown), NIC 826, and/or antennas (not shown).

Terminal 851 and/or terminal 845 may be portable devices such as a laptop, cell phone, Blackberry™, tablet, smartphone, or any other suitable device for receiving, storing, transmitting and/or displaying relevant information. Terminals 851 and/or terminal 845 may be other devices such as remote servers, including authentication and transaction servers.

Any information described above in connection with data 811, and any other suitable information, may be stored in memory 815. One or more of applications 819 may include one or more algorithms that may be used to implement features of the disclosure, and/or any other suitable tasks.

The invention may be operational with numerous other general purpose or special purpose computing apparatus environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like. Secure systems and servers may be preferable.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications or remote authentication protocols. In a distributed computing environment, program modules may be located in both local and remote computer storage media including memory storage devices.

Figure 9:
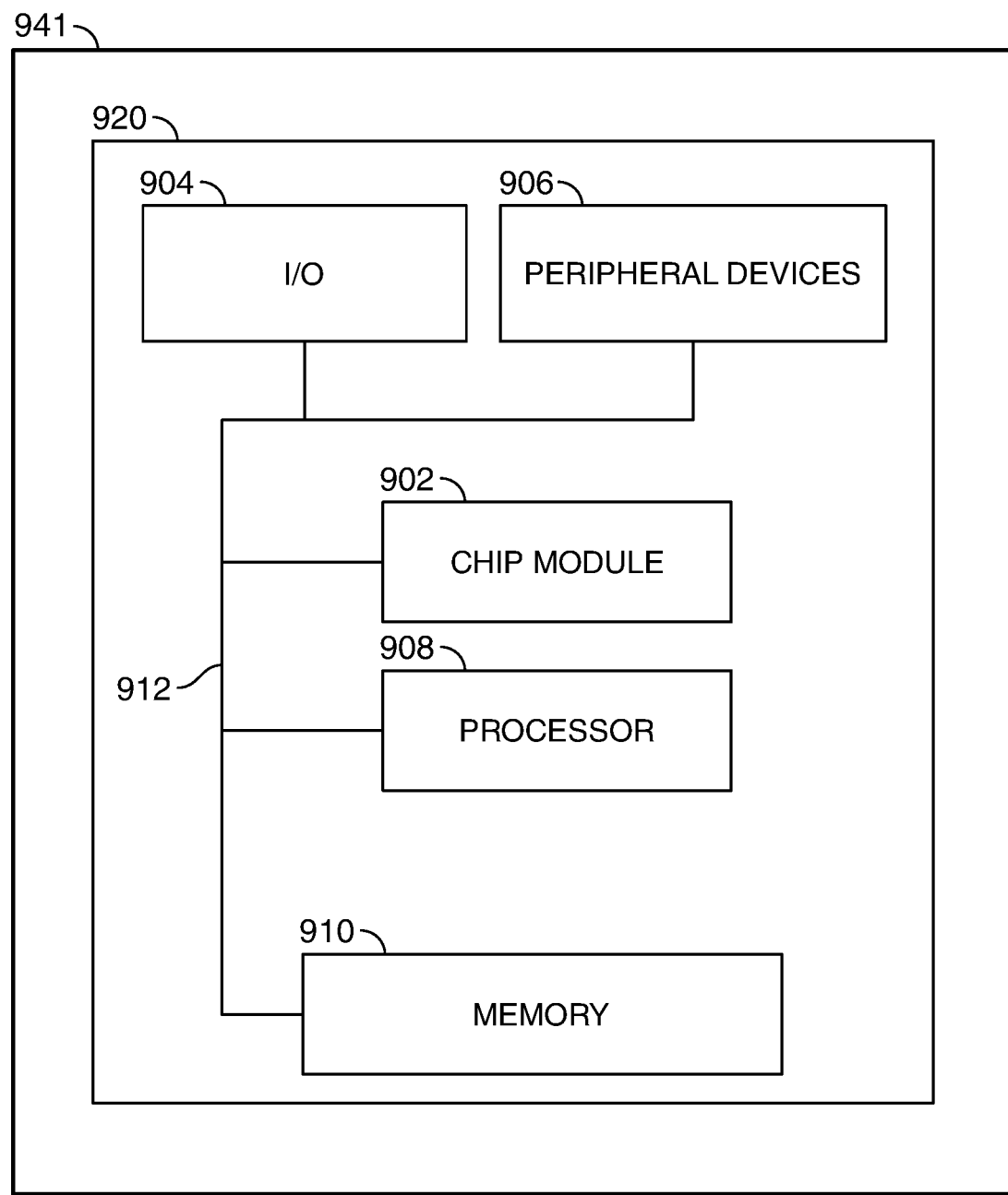
FIG. 9 shows an illustrative system in accordance with the principles of the disclosure.

FIG. 9 shows illustrative apparatus 941 that may be configured in accordance with the principles of the disclosure. Apparatus 941 may be a contact-minimized ATM. Apparatus 941 may include one or more features of the apparatus and methods shown in FIGS. 1-8. Apparatus 941 may include circuit board 920 and chip module 902, which may include one or more integrated circuits, and which may include logic configured to perform any other suitable logical operations.

Apparatus 941 and/or circuit board 920 may include one or more of the following components: I/O circuitry 904, which may include a transmitter device and a receiver device and may interface with fiber optic cable, coaxial cable, telephone lines, wireless devices, PHY layer hardware, a keypad/display control device, an LED screen, a touchscreen, a radar transmitter and receiver, or any other suitable media or devices; peripheral devices 906, which may include batteries and chargers, counter timers, real-time timers, power-on reset generators or any other suitable peripheral devices; logical processing device 908, which may compute data structural information and structural parameters of the data; and machine-readable memory 910.

Machine-readable memory 910 may be configured to store in machine-readable data structures: machine executable instructions (which may be alternatively referred to herein as "computer instructions" or "computer code"), applications, signals, encryption algorithm(s), recorded data, and/or any other suitable information or data structures.

Components 902, 904, 906, 908 and 910 may be coupled together by a system bus or other interconnections 912 and may be present on one or more circuit boards such as 920. In some embodiments, the components may be integrated into a single chip. The chip may be silicon-based.

Thus, apparatus and methods for contact-minimized ATM use and transaction processing using doppler-radar based gesture authentication and control have been provided. Persons skilled in the art will appreciate that the present invention can be practiced by other than the described embodiments, which are presented for purposes of illustration rather than of limitation.

What is claimed is:
1. A contact-minimized automatic teller machine ("ATM") comprising:
a housing;
a microprocessor disposed in the housing;
a card reader disposed in the housing and electronically coupled to at least the microprocessor, configured to read an ATM card;
a screen disposed in the housing and electronically coupled to at least the microprocessor, configured to display ATM transaction options;
a cash dispenser disposed in the housing and electronically coupled to at least the microprocessor;
a millimeter-wave radar transmitter disposed in the housing and electronically coupled to at least the microprocessor, wherein the radar transmitter is configured to provide a radar field in front of the housing with a height, depth, and width;
a radar receiver disposed in the housing and electronically coupled to at least the microprocessor, wherein the radar receiver is configured to receive radar reflections from one or more synthetic objects belonging to a user within the radar field;

an analog-to-digital signal converter disposed in the housing and electronically coupled to at least the microprocessor and the radar receiver, wherein the signal converter is configured to convert analog radar reflections to digital data;

non-transitory memory disposed in the housing and electronically coupled to at least the microprocessor, wherein the non-transitory memory is configured to:
store the analog radar reflections;
store the digital data; and
store an operating system;

a communication circuit disposed in the housing and electronically coupled to at least the microprocessor, wherein the communication circuit is configured to receive and transmit the digital data; and a digital signal processor disposed inside the housing and electronically coupled to at least the microprocessor, the signal converter, and the non-transitory memory, wherein the digital signal processor is configured to:
identify the one or more synthetic objects belonging to the user within the radar field;
analyze any movement of the one or more synthetic objects within the radar field using a Doppler method;
convert the movement of the one or more synthetic objects into gestures or writing symbols; and
translate the writing symbols into words, numerals, or symbols;

wherein the operating system is configured to:
display on the screen a plurality of transaction options for the user;
translate one or more gestures by the user within the radar field selecting at least one transaction; and
process the at least one transaction.

2. The ATM of claim 1 wherein the communication circuit is configured to communicate with a remote digital signal processor, and wherein the remote digital signal processor is configured to:
identify the one or more synthetic objects belonging to the user within the radar field;
analyze any movement of the one or more synthetic objects within the radar field using a Doppler method;
convert the movement of the one or more synthetic objects into gestures or writing symbols; and
translate the writing symbols into words, numerals, or symbols.

3. The ATM of claim 1 wherein the at least one object is a stylus held by a hand belonging to a customer.

4. The ATM of claim 1 wherein the radar field is continuous while the radar transmitter is active.

5. The ATM of claim 1 wherein the radar field has a depth between six inches and fifteen feet.

6. The ATM of claim 1 wherein the radar field is pulsed.

7. The ATM of claim 1 wherein the radar transmitter operates at a frequency between 3 GHz and 300 GHz.

8. The ATM of claim 1 wherein the communication circuit further comprises a cellular antenna.

9. The ATM of claim 1 wherein the communication circuit further comprises a wi-fi antenna.

10. The ATM of claim 1 further comprising an encryption controller.

11. The ATM of claim 1 wherein the non-transitory memory further comprises executable instructions and at least one datum configured to authenticate a user.

12. A method for providing contact-minimized interaction with an ATM, said method comprising:
sensing, at the ATM, an ATM card;
identifying, at the ATM, a customer associated with the ATM card;
activating, at the ATM, a Doppler millimeter-wave radar transmitter;
transmitting, from the radar transmitter, a radar field;
prompting, by the ATM, the customer to write within the radar field an authentication passcode;
receiving, at a radar receiver, Doppler radar reflections from one or more synthetic objects belonging to the user within the radar field;
digitizing, at the ATM, the Doppler radar reflections;
processing, at a digital signal processor ("DSP") at the ATM, the Doppler radar reflections;
identifying, at the DSP, at least one target of the customer, wherein the at least one target is all or a portion of the one or more synthetic objects;
resolving and analyzing, at the DSP, movement of the at least one target;
translating, at the DSP, the movement of the at least one target into gestures, words, numerals, or symbols;
sending, from the ATM to an authentication server, the gestures, words, numerals, or symbols;
authenticating the customer, at the authentication server, by matching the gestures, words, numerals, or symbols to gestures, words, numerals or symbols associated with an authentication passcode of the customer;
informing, by the authentication server, the ATM when the customer has correctly provided the authentication passcode;
displaying, at the ATM, a plurality of transaction options for the customer, in response to the customer correctly providing the authentication passcode;
selecting, at the ATM, at least one transaction through at least one gesture by the one or more synthetic objects in the radar field; and
processing, at the ATM, the at least one transaction.

13. The method of claim 12 further comprising:
employing, at the DSP, at least one machine learning algorithm to:
identify the at least one target;
resolve the movement of the at least one target; and
translate the movement into gestures, words, numerals, and symbols.

14. The method of claim 12 wherein the one or more synthetic objects is a stylus held by the customer.

15. The method of claim 14 wherein the at least one target is a point on the stylus.

16. A method for providing contact-minimized interaction with an ATM, said method comprising:
sensing, at the ATM, an ATM card;
identifying, at the ATM, a customer associated with the ATM card;
activating, at the ATM, a Doppler millimeter-wave radar transmitter;
transmitting, from the radar transmitter, a radar field;
prompting, by the ATM, the customer to write within the radar field an authentication passcode;
receiving, at a radar receiver, Doppler radar reflections from one or more synthetic objects belonging to the user within the radar field;
digitizing, at the ATM, the Doppler radar reflections;

sending, from the ATM, the digitized Doppler radar reflections to a remote digital signal processor ("DSP") processing, at the remote DSP, the Doppler radar reflections;

identifying, at the DSP, at least one target of the customer, wherein the at least one target is all or a portion of the one or more synthetic objects;

resolving and analyzing, at the DSP, movement of the at least one target;

translating, at the DSP, the movement of the at least one target into gestures, words, numerals, or symbols;

sending, from the DSP to an authentication server, the gestures, words, numerals, or symbols;

authenticating the customer, at the authentication server, by matching the gestures, words, numerals, or symbols to gestures, words, numerals, or symbols associated with the customer;

informing, by the authentication server, the ATM when the customer has correctly provided an authentication passcode;

displaying, at the ATM, a plurality of transaction options for the customer, in response to the customer correctly providing the authentication passcode;

selecting, at the ATM, at least one transaction through at least one gesture by the one or more synthetic objects in the radar field; and processing, at the ATM, the at least one transaction.

17. The method of claim 16 wherein the one or more synthetic objects is a stylus.

18. The method of claim 17 wherein the at least one target is a point on the stylus.

19. The method of claim 16 further comprising:
employing, at the DSP, at least one machine learning algorithm to:
identify the at least one target;
resolve the movement of the at least one target; and
translate the movement into gestures, words, numerals, and symbols.

* * * * *